United States Patent
Lancaster-Larocque et al.

(10) Patent No.: US 11,416,082 B1
(45) Date of Patent: Aug. 16, 2022

(54) INPUT DEVICES WITH GLYPHS HAVING A SEMITRANSPARENT MIRROR LAYER

(71) Applicant: Apple Inc., Cupertino, CA (US)

(72) Inventors: Simon R. Lancaster-Larocque, San Jose, CA (US); Dinesh C. Mathew, San Francisco, CA (US); Christiaan A. Ligtenberg, San Carlos, CA (US); Mikael M. Silvanto, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/964,164

(22) Filed: Apr. 27, 2018

Related U.S. Application Data

(60) Provisional application No. 62/554,132, filed on Sep. 5, 2017.

(51) Int. Cl.
*H01H 9/18* (2006.01)
*G06F 3/02* (2006.01)
*G06F 1/16* (2006.01)
*F21Y 115/10* (2016.01)
*F21V 7/28* (2018.01)

(52) U.S. Cl.
CPC ............ *G06F 3/021* (2013.01); *G06F 1/1616* (2013.01); *G06F 1/1662* (2013.01); *H01H 9/182* (2013.01); *F21V 7/28* (2018.02); *F21Y 2115/10* (2016.08)

(58) Field of Classification Search
CPC combination set(s) only.
See application file for complete search history.

(56) References Cited

U.S. PATENT DOCUMENTS

| | | | | | |
|---|---|---|---|---|---|
| 4,553,820 | A | * | 11/1985 | Harada | G02F 1/13338 341/34 |
| 5,404,133 | A | * | 4/1995 | Moriike | H01H 13/023 362/23.17 |
| 6,036,326 | A | * | 3/2000 | Yoshikawa | H01H 13/83 200/310 |
| 6,803,903 | B1 | * | 10/2004 | Osterg | H01H 13/702 200/5 A |
| 2003/0034240 | A1 | * | 2/2003 | Duarte | H01H 13/84 200/311 |
| 2004/0129542 | A1 | * | 7/2004 | Kawaguchi | H01H 9/182 200/61.1 |
| 2005/0073824 | A1 | * | 4/2005 | Kuo | H04M 1/22 362/23.03 |
| 2005/0150753 | A1 | * | 7/2005 | Hsu | H01H 13/83 200/314 |
| 2007/0165002 | A1 | * | 7/2007 | Wassingbo | G06F 3/0233 345/169 |
| 2007/0295588 | A1 | * | 12/2007 | Kamata | H01H 13/83 200/341 |

(Continued)

*Primary Examiner* — William Boddie
*Assistant Examiner* — Alecia D English
(74) *Attorney, Agent, or Firm* — Dorsey & Whitney LLP

(57) ABSTRACT

An electronic device includes an enclosure, a substrate within the enclosure, a keycap support mechanism, and a keycap supported by the keycap support mechanism and movable relative to the substrate. The keycap includes a body, a mask layer defining a glyph opening, and a semitransparent mirror layer positioned within the glyph opening. The electronic device also includes a light source configured to direct light through the semitransparent mirror layer.

19 Claims, 13 Drawing Sheets

(56) References Cited

U.S. PATENT DOCUMENTS

| | | | | |
|---|---|---|---|---|
| 2008/0060921 | A1* | 3/2008 | Isakov | H01H 13/83 200/314 |
| 2008/0247172 | A1* | 10/2008 | Beeson | G02B 5/285 362/308 |
| 2010/0026632 | A1* | 2/2010 | Ishida | H04M 1/22 345/170 |
| 2011/0011711 | A1* | 1/2011 | Lin | F21V 33/006 200/314 |
| 2012/0154289 | A1* | 6/2012 | Mahowald | G06F 3/0202 345/169 |
| 2012/0217147 | A1* | 8/2012 | Porter | H03K 17/962 200/600 |
| 2012/0257376 | A1* | 10/2012 | Zhou | G09F 13/04 362/97.1 |
| 2013/0106706 | A1* | 5/2013 | Meierling | H01H 13/83 345/170 |
| 2013/0265799 | A1* | 10/2013 | Chuang | G06F 3/0202 362/602 |
| 2015/0083561 | A1* | 3/2015 | Han | H01H 13/83 200/314 |
| 2016/0306437 | A1* | 10/2016 | Zhang | G06F 1/1662 |
| 2018/0040441 | A1* | 2/2018 | Wu | H01H 13/83 |
| 2018/0313528 | A1* | 11/2018 | Morrison | G06F 1/1616 |
| 2019/0050619 | A1* | 2/2019 | Kern | G06F 3/0421 |
| 2019/0051473 | A1* | 2/2019 | Peterson | G06F 3/0202 |

* cited by examiner

US 11,416,082 B1

INPUT DEVICES WITH GLYPHS HAVING A SEMITRANSPARENT MIRROR LAYER

CROSS-REFERENCE TO RELATED APPLICATION(S)

This application is a nonprovisional patent application of and claims the benefit of U.S. Provisional Patent Application No. 62/554,132, filed Sep. 5, 2017 and titled "Input Devices with Glyphs having a Semitransparent Mirror Layer," the disclosure of which is hereby incorporated by reference herein in its entirety.

FIELD

Embodiments described herein relate to input devices, and in particular, to input devices with glyphs formed by semitransparent mirrors.

BACKGROUND

Electronic devices can receive user input from a keyboard, some keys of which may be illuminable and thus may be made visible to a user in dimly-lit environments. For example, keys of the keyboard may include keycaps with glyphs (e.g., symbols indicating letters, numbers, punctuation marks, characters, or other information) that indicate the function of the key. Such glyphs may be formed from transparent or translucent regions of a keycap, and may be illuminated by a light source below the keycap. For example, each key may be associated with a light source such as a light emitting diode (LED) that illuminates the glyph from below.

SUMMARY

An electronic device includes an enclosure, a substrate within the enclosure, a keycap support mechanism, and a keycap supported by the keycap support mechanism and movable relative to the substrate. The keycap includes a body, a mask layer defining a glyph opening, and a semitransparent mirror layer positioned within the glyph opening. The body may be glass. The device also includes a light source configured to direct light through the semitransparent mirror layer. The light source may be a light emitting diode positioned below the keycap. The mask layer may be positioned below the body, and at least part of the semitransparent mirror layer may be positioned below the mask layer.

The mask layer may be substantially opaque and may be configured to produce a non-specular reflection, and the semitransparent mirror layer may be a metal coating configured to, in a first lighting condition, reflect external light incident on the semitransparent mirror layer, and in a second lighting condition, transmit light from the light source through the semitransparent mirror layer.

The semitransparent mirror layer may be a metal coating. The metal may be selected from the group consisting of silver, aluminum, beryllium, chromium, copper, gold, molybdenum, nickel, and platinum.

An actuation member for an key assembly includes a transparent body, a substantially opaque mask layer defining a glyph opening, and a semitransparent mirror layer aligned with the glyph opening and configured to produce a visible glyph when the actuation member is illuminated from below the actuation member or from above the actuation member. At least a portion of the semitransparent mirror layer may be within the glyph opening. Another portion of the semitransparent mirror layer may be below the substantially opaque mask layer.

The semitransparent mirror layer may be between about 60% and about 85% reflective. The semitransparent mirror layer may have a thickness between about 5 microns and about 50 microns.

The transparent body may be formed from a material selected from the group consisting of glass, plastic, ceramic, and sapphire. The transparent body may include a top surface defining an input surface of the actuation member, a bottom surface opposite the top surface, and a side surface extending between the top surface and the bottom surface. The semitransparent mirror layer may cover at least part of the side surface.

A laptop computer may include a display portion, a display positioned within the display portion, a base portion pivotally coupled to the display portion, a keyboard at least partially surrounded by the base portion and comprising a key, and an optical sensor below the key. The key may include a keycap and a semitransparent mirror layer on a bottom of the keycap. The optical sensor may be configured to receive light through the semitransparent mirror layer and the keycap. The optical sensor may be configured to detect an optical condition indicative of a presence of an object above the keycap. The optical sensor may be configured to detect an optical condition indicative of motion of the keycap.

The laptop computer may further include a light source below the keycap and configured to transmit light through the semitransparent mirror layer. The light received by the optical sensor through the semitransparent mirror layer may be the light, from the light source, reflected by an object above the keycap. The keycap may further include an opaque mask layer defining an opening, and the semitransparent mirror layer may be positioned at least partially within the opening.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
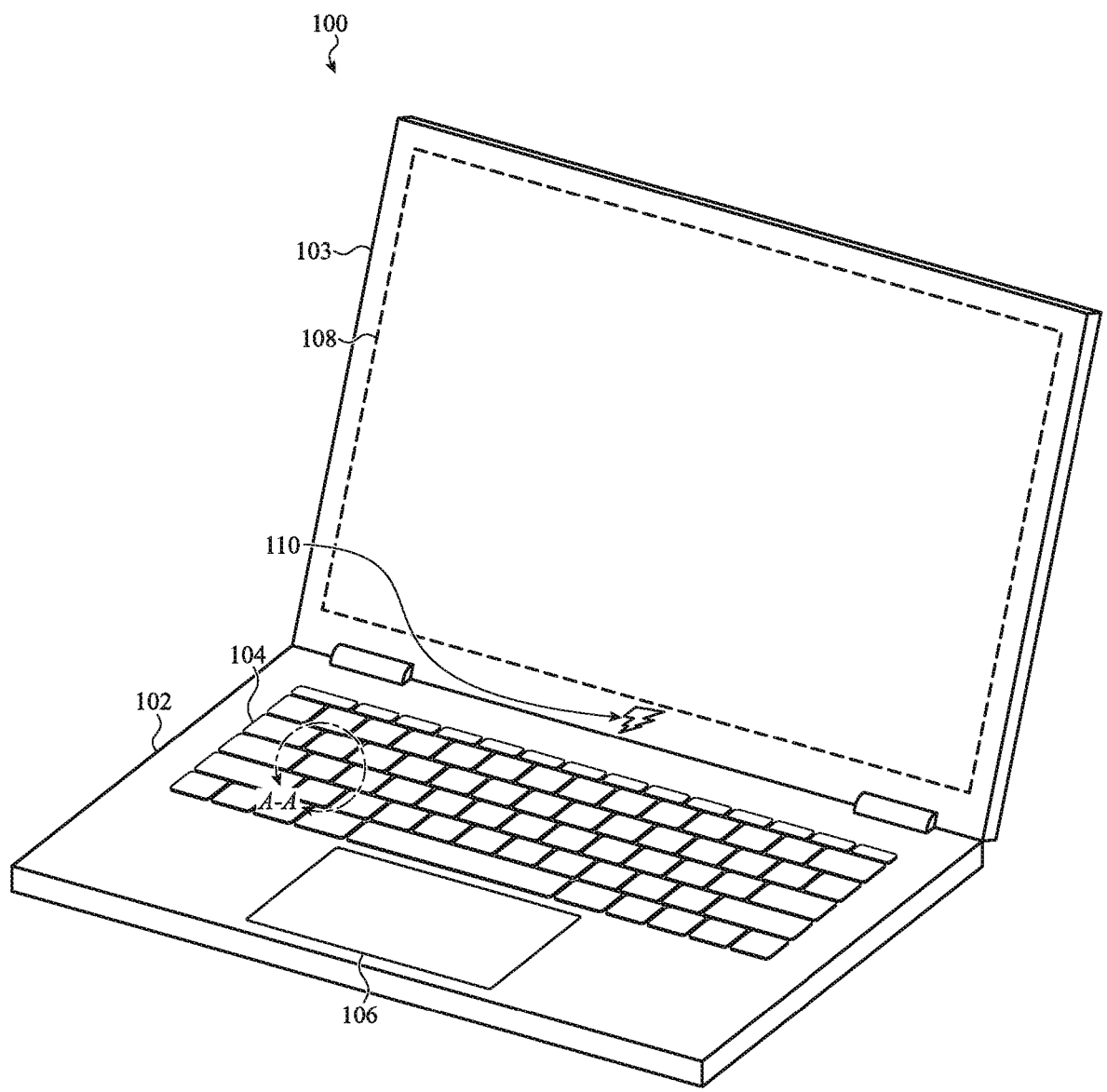
FIG. 1 depicts an example electronic device.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to input devices, such as keyboards, that include illuminable keycaps or other input mechanisms. For example, keycaps may include glyphs (e.g., symbols indicating letters, numbers, punctuation marks, characters, or other information) that can be illuminated via a light source below the keycap. Illuminating the glyphs may increase their visibility, especially in low-light conditions, allowing users to more easily locate keys and identify their particular function.

Described herein are keycaps that include a semitransparent mirror layer on a glyph portion of the keycap. The semitransparent mirror layer, similar to a one-way mirror, can allow light from below the keycap (e.g., from a light emitting diode below the keycap) to pass through to produce an illuminated glyph, but can also reflect light from above the keycap (e.g., ambient light) to produce a visible glyph when the backlighting is not active. Such a keycap may thus present a visually distinctive glyph both when backlit, and when lit externally by ambient light. While the application refers to keycaps, the concepts described herein may equally apply to other types of actuation members, such as button members for buttons, switch members for switches (e.g., toggle switches), and the like.

The semitransparent mirror layer may be a thin film or coating of reflective metal deposited on a keycap. For example, an opaque mask layer may be applied to a transparent (e.g., glass or plastic) keycap. The mask layer may define a glyph opening, and the reflective metal may be deposited in the glyph opening. The reflective metal layer may be sufficiently thin that light can pass through the metal layer (e.g., from below the keycap), while also appearing to be substantially opaque and reflective under certain lighting conditions. The resulting key thus has an opaque region, defined by the mask, that surrounds and/or defines the glyph, and a semitransparent mirror in the glyph opening and defining the glyph itself.

In some cases, a semitransparent mirror layer may be used in other aspects of an electronic device in order to leverage its unique optical properties. For example, semitransparent mirror layers as described herein may be used to produce a logo, design, text, or any other symbol or indicia that can be backlit while also producing a reflective, mirrored surface when viewed under ambient light. As another example, a semitransparent mirror layer on a keycap or other transparent input surface (e.g., a trackpad surface or a surface of a glass keyboard) may be aligned with an optical sensor that detects light through the semitransparent mirror layer. Such optical sensors may be used, for example, to detect the presence or motion of a keycap, a user's fingers, or other implements on or above input devices such as keys and trackpads. Semitransparent mirror layers may also be used for input devices other than keyboard keys, and may be used on other types of devices. For example, semitransparent mirror layers may be used on buttons (e.g., power buttons, volume buttons, etc.), sliders (e.g., virtual or physical sliding affordances), or any other affordance for which an illuminable glyph may be useful. Moreover, keys and other input devices with illuminable glyphs may be used in applications other than just laptop computers or other personal electronic devices. For example, illuminable symbols using semitransparent mirror layers may be used for input devices or other visual indicia in industrial machinery, vehicles (e.g., dashboard controls, logos, etc.), desktop computers, elevators, or the like.

FIG. 1 depicts an electronic device 100 that may use semitransparent mirror layers to produce symbols that may be reflective under some lighting conditions and backlit or illuminated under other lighting conditions. The electronic device 100 is depicted as a laptop computer, though this is merely one example electronic device that may incorporate semitransparent mirror layers as described herein. Accordingly, the concepts discussed herein may apply equally or by analogy to other electronic devices, including mobile phones (e.g., smartphones), wearable electronic devices (e.g., watches, fitness trackers, biometric sensors), head-mounted displays, digital media players (e.g., mp3 players), implantable electronic devices, or the like.

The electronic device 100 includes an enclosure that includes a base portion 102 and a display portion 103. The display portion may include a cover 108, such as a glass, plastic, ceramic, or other substantially transparent material, component, or assembly, attached to the display portion 103 and covering a display. The display portion 103 may be pivotally coupled to the base portion 102.

The base portion 102 may include, support, or surround a keyboard 104 that includes a plurality of keys or key regions. Each key of the keyboard may be positioned within or surrounded by the base portion, which is to say that a key web or other part of the base portion may surround a perimeter of each key, and/or that a key (including a keycap of the key) may extend through, protrude from, and/or be depressible into an opening in the base portion. The keyboard 104 is configured to receive typing inputs via the keys or key regions. As described herein, the keys may include keycaps or other input components or areas that include illuminable glyphs formed at least in part by semitransparent mirror layers (e.g., semitransparent coatings, which may be metal coatings or otherwise include metal). In some cases, the base portion 102 may include a substantially continuous glass cover on which individual key regions are visually distinguished without movable keycaps (as described herein with respect to FIGS. 10A-10C). In such cases, as described herein, both glyphs and the borders of individual key regions may be defined by or include semitransparent mirror layers.

The base portion 102 may also include other input regions. For example, the electronic device 100 may include, in the base portion 102, a trackpad 106 that is configured to receive touch and/or force based inputs, such as taps, swipes, gestures, multi-finger inputs, clicks, or the like. The electronic device 100 may also include other input devices such as buttons (a power button, a volume button, or the like), a slider (e.g., a virtual or physical sliding affordance), a fingerprint sensor, or the like. As described herein, the trackpad 106 or any other input device incorporated with the electronic device 100 may also include illuminable glyphs or symbols defined by semitransparent mirror layers or materials.

The electronic device 100 may also include a logo 110, which may include a transparent cover, a semitransparent mirror layer, and a backlight. This configuration, similar to the keycap glyphs described herein, may produce a logo 110 that can be illuminated from behind, but may also appear as opaque and reflective when not illuminated from behind. The logo 110 is shown incorporated with the cover 108, though logos or other indicia using semitransparent mirror layers may be located or positioned elsewhere on the device 100, such as on an exterior surface of the display portion 103 or any other suitable location (as shown in FIG. 9C). Also, while the logo 110 is shown as a lightning bolt, other symbols or shapes are also possible, including text.

Figure 2A:
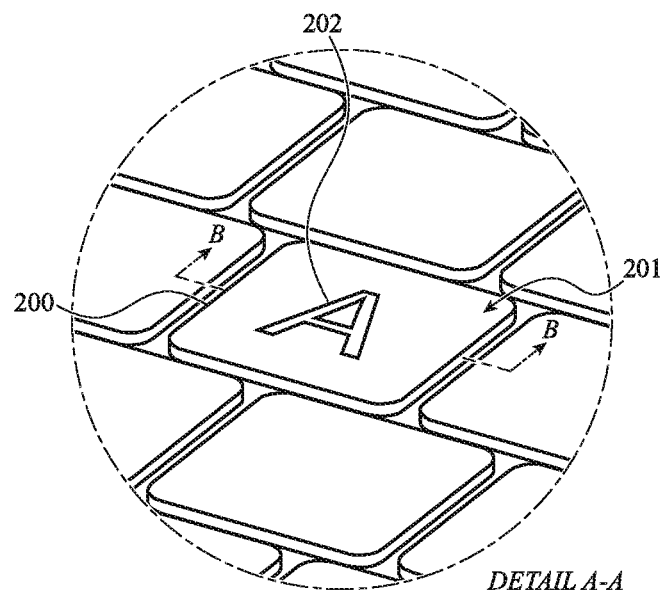
FIGS. 2A-2B depict an example key having glyph that includes a semitransparent mirror layer.
Figure 2B:
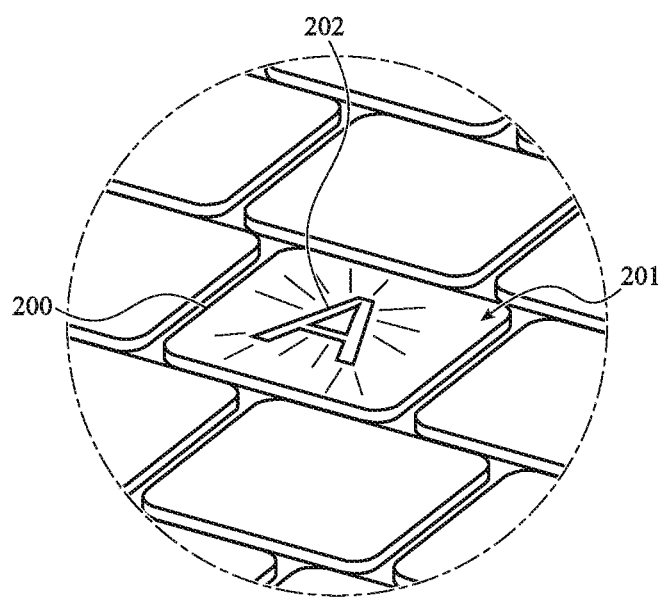

FIGS. 2A-2B are detail views of a region A-A in FIG. 1, showing a keycap 200 with a glyph 202 in two different lighting conditions. While FIGS. 2A-2B show a keycap (e.g., of a keyboard key), the keycap 200 is also representative of other input devices or surfaces, such as actuation members, buttons, sliders, trackpads, fingerprint sensors, touch and/or force sensitive input regions, and the like.

In FIG. 2A, the keycap 200 is in an ambient light condition (which may be referred to as a first lighting condition). For example, an optical component such as a backlight positioned below the keycap 200 may be off or otherwise not producing enough light to be noticeable to an observer. The glyph 202, which may include a semitransparent mirror layer as described herein, may reflect ambient light that is incident on the glyph 202, thereby appearing opaque and producing a highly specular reflection similar to a mirror. The glyph 202 may contrast with the surrounding area 201 of the keycap 200 (which may be defined by an opaque mask), which may produce a diffuse or non-specular reflection of the ambient light, or which may otherwise contrast with the appearance of the glyph 202 under ambient light (e.g., non-backlit) conditions. For example, as described herein, the surrounding area 201 may correspond to an opaque mask layer formed from a dye, ink, film, or the like.

FIG. 2B shows the keycap 200 under a second lighting condition, where light from a light source below the keycap 200 is transmitted through the semitransparent mirror layer to illuminate the glyph 202. As noted above, the surrounding area 201 may correspond to an opaque mask that blocks light from the light source, thus producing an illuminated glyph 202 with an unilluminated area surrounding the glyph 202.

As shown in FIGS. 2A-2B, incorporating a semitransparent mirror layer as described herein produces a glyph 202 that is both opaque and visible under ambient light (e.g., non-backlit) conditions, but is also illuminable by a backlight to produce an illuminated glyph. While the description may refer to an ambient light condition as a non-backlit condition, a backlight may be on or active even in cases where the backlighting is not visible. In particular, due to the optical properties of semitransparent mirrors, the relative intensity of light on both sides of a semitransparent mirror layer determine if the glyph 202 appears as an opaque mirror or as an illuminated glyph. For example, if the ambient light incident on the glyph 202 (e.g., from above the keycap 200) is brighter than the light directed through the glyph 202 from below the keycap, the glyph 202 may appear to be opaque and reflective (e.g., not illuminated) even though a backlight may be active. On the other hand, if the light directed through the glyph 202 from below the keycap 200 is brighter than the light incident on the glyph 202 from above the keycap 200, the glyph 202 may appear illuminated, even if the keycap 200 is being viewed in a relatively bright ambient light condition (e.g., during daytime or in a bright environment).

Accordingly, a lighting condition, as used herein, may refer to a particular relative brightness or intensity of light on either side of the glyph 202, rather than any particular state of a backlight. For example, a first lighting condition may correspond to a condition in which the light incident on the top surface of the glyph 202 is sufficiently brighter than the light incident on the bottom surface of the glyph 202 that the glyph 202 appears as an opaque mirror, and a second lighting condition may correspond to a condition in which the light incident on the top surface of the glyph 202 is sufficiently less bright than the light incident on the bottom surface of the glyph 202 that the glyph 202 appears illuminated.

Figure 3A:
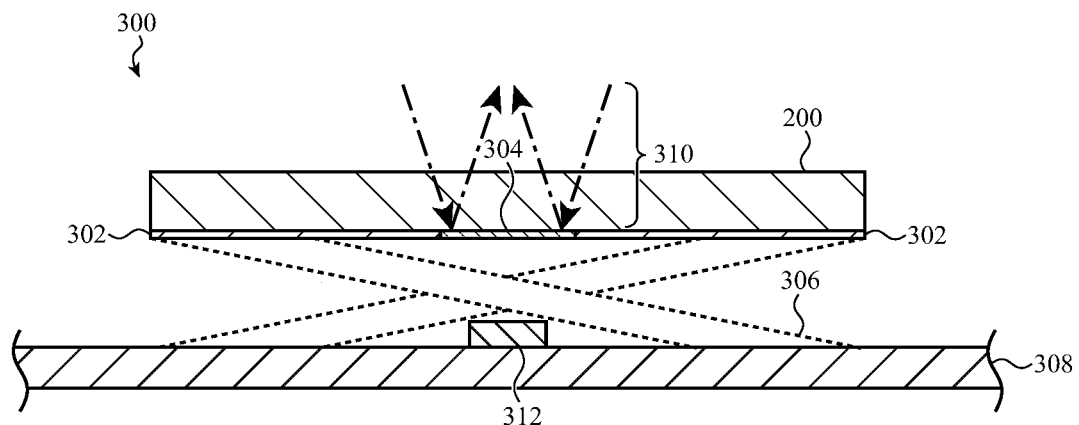
FIGS. 3A-3C depict partial cross-sectional views of a key under various lighting conditions.
Figure 3B:
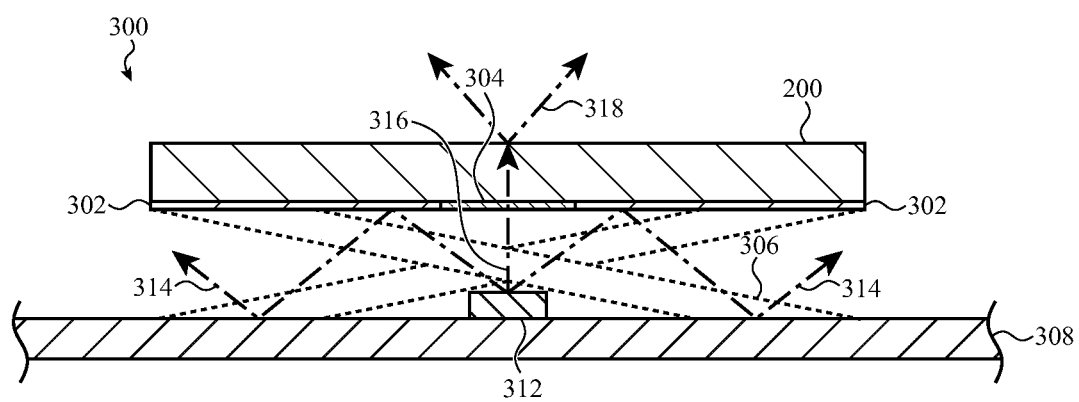

FIGS. 3A-3B show partial cross-sectional views of a key assembly 300 that includes the keycap 200, viewed along line B-B in FIG. 2A. FIG. 3A shows the key assembly 300 in a first lighting condition (e.g., ambient), while FIG. 3B shows the key assembly 300 in a second lighting condition (e.g., illuminated by a backlight). While the instant discussion relates to a key assembly for a keyboard, it will be understood that the same concepts apply equally or by analogy to other types of input devices, such as mechanical buttons, force and/or touch sensitive input surfaces, fingerprint sensors, or the like.

As shown in FIG. 3B, the key assembly 300 includes a keycap 200 having a top surface (or actuation surface) that a user contacts when actuating or pressing the keycap 200, and a bottom surface opposite the top surface. The keycap 200 may be formed of glass, plastic, ceramic, sapphire, or the like, and may be transparent or substantially transparent. The keycap 200 may include an opaque mask layer 302 that defines a glyph opening, and a semitransparent mirror layer 304 within the glyph opening. The keycap 200 may be movably supported relative to a substrate 308 (e.g., a printed circuit board or any other suitable substrate) by a keycap support mechanism 306, which may be a butterfly mechanism (e.g., a butterfly hinge), a scissor mechanism, or any other suitable mechanism or support structure that supports the keycap 200 and allows the keycap 200 to move relative to the substrate (e.g., allows the keycap 200 to move between an undepressed or "up" position and a depressed or "down" position).

The key assembly 300 may also include a light source 312 (an optical component) below the keycap 200 and configured to direct light through the semitransparent mirror layer. The light source 312 may be any suitable light source, such as an LED or other light emitting component positioned below the keycap 200 and optionally coupled to the substrate 308. As another example, the light source 312 may be an outlet or light extraction feature of a light guide, where a light emitting element is positioned remote from the keycap 200 (e.g., not directly under the keycap 200). Light may be transmitted from the remote light source through the light guide to the outlet or extraction feature of the key assembly 300, and optionally to other key assemblies as well.

As shown in FIG. 3A, light 310 from a source external to the key assembly 300, such as ambient light around the device 100, may specularly reflect off of the semitransparent mirror layer 304, thus producing the appearance of an opaque, mirrored glyph. As shown, the semitransparent mirror layer 304 is positioned on a bottom of the keycap 200. Accordingly, the light 310 travels through the keycap 200 before and after reflecting off of the semitransparent mirror layer 304. In some cases, the semitransparent mirror layer 304 and the opaque mask layer 302 may be positioned on a top of the keycap 200, in which case ambient light may be reflected without passing through the keycap 200.

Because the semitransparent mirror layer 304 is only semitransparent, some of the incident light may be transmitted through the semitransparent mirror layer 304 to an area below the keycap 200. However, such transmitted light may not be visible from above the keycap 200, which may partially contribute to the opaque appearance of the glyph. Ambient light transmitted through the semitransparent mirror layer 304 to the area below the keycap 200 is omitted from FIG. 3A for clarity. Moreover, as noted above, the light source 312 is shown in FIG. 3A as not producing or emitting any light, though it will be understood that if the intensity of the ambient light is high enough relative to the intensity of light emitted from the light source 312 (for a given transmissivity of the mirror layer), the glyph may appear not to be backlit even if the light source is active.

FIG. 3B shows the key assembly 300 in a second lighting condition, where the light source 312 is emitting light 316 that is passing through the semitransparent mirror layer 304. This light 316 may be visible to an observer, and may produce the appearance of an illuminated glyph. Some of the light 314 emitted from the light source 312 may be directed against the opaque mask layer 302. Such light may be absorbed or reflected by the opaque mask layer 302. Because the mask layer 302 is opaque, such light may be blocked or otherwise not transmitted through the keycap 200, and thus may not be visible to an observer of the key assembly 300.

Figure 3C:
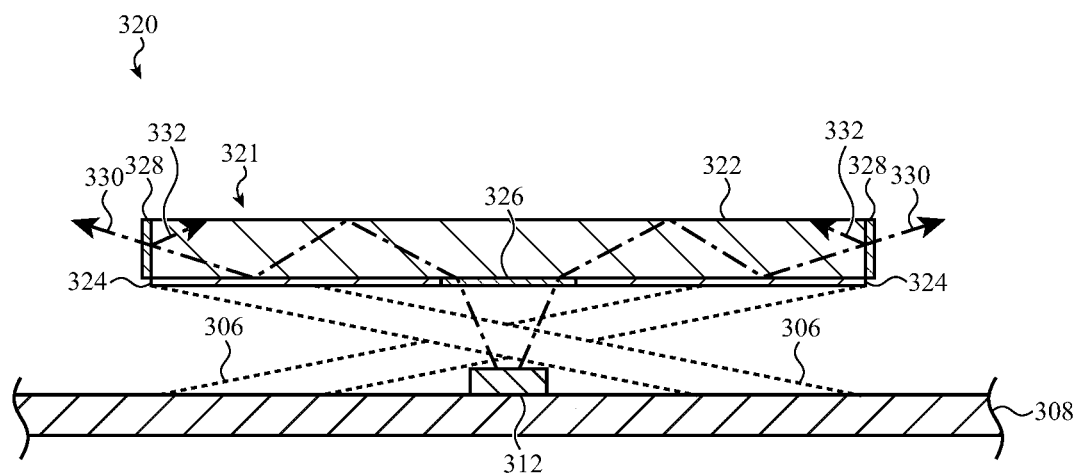

FIG. 3C shows another example key assembly 320 that includes a semitransparent mirror layer around a peripheral side surface of a keycap body 322. For example, the key assembly 320 may include a keycap 321, which may be substantially similar to the keycap 200 described above, and may be formed of the same or similar materials and have the same or similar optical properties as the keycap 200 (e.g., it may be substantially transparent). The keycap 321 may include a mask layer 324 (similar to the mask layer 302) and a semitransparent mirror layer 326 (similar to the semitransparent mirror layer 304) positioned in a glyph opening defined by the mask layer 324. The keycap 321 may also include a semitransparent mirror layer 328 covering at least part of a side surface of the keycap body 322. The semitransparent mirror layer 328 may be configured to allow only some of the light traveling through the keycap body 322 to escape from the side surface of the keycap 321. For example, light entering the keycap body 322 from the light source 312 (or from an external or ambient light source) may travel through the material of the keycap body 322 and be directed to the side of the keycap 321. The semitransparent mirror layer 328 may allow some of the light (arrow 330) to pass through the semitransparent mirror layer 328, while reflecting some of the light back into the keycap body 322 (arrow 332). The reflectance or opacity of the semitransparent mirror layer 328 may determine how much light is reflected and how much light is transmitted, thus defining the appearance of the light that surrounds the keycap 321.

Figure 4:
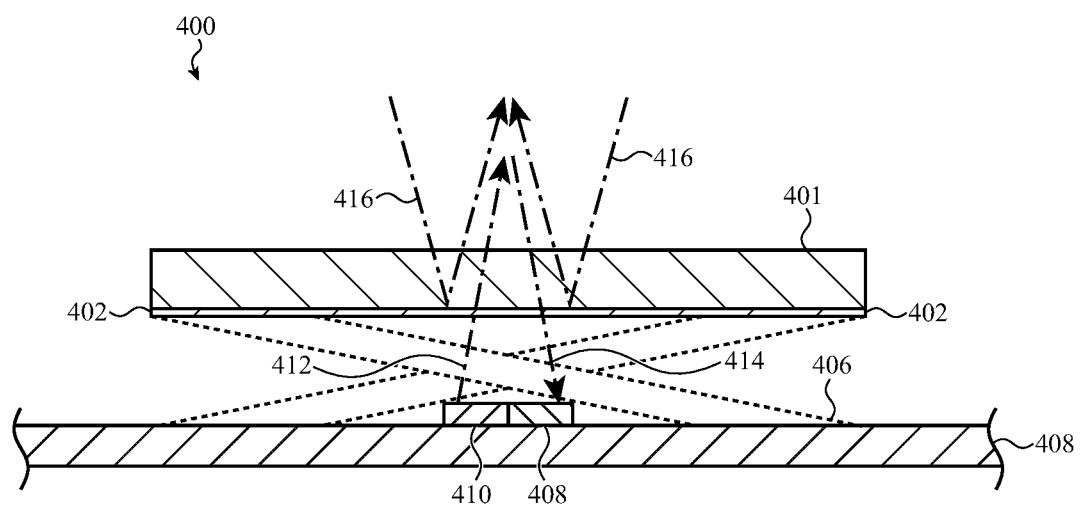
FIG. 4 depicts an example key having an optical sensor below the key.

As noted above, a semitransparent mirror layer may also be used over an optical sensor (e.g., a type of optical component) to allow the optical sensor to detect light through the semitransparent mirror layer and/or the keycap. FIG. 4 illustrates a partial cross-sectional view of a key assembly 400 (which may also represent other input devices or buttons, as noted above) that includes an optical sensor 408 below a keycap 401 with a semitransparent mirror layer 402. Due to the partial transmissivity of the semitransparent mirror layer 402, the optical sensor 408 can detect light through the semitransparent mirror layer 402 (illustrated by arrow 414) to detect various light or optical conditions. For example, the optical sensor 408 may detect an optical condition indicative of a presence of an object above the keycap 401, such as a user's finger. As another example, the optical sensor 408 may detect an optical condition indicative of movement of the user's finger or movement of the keycap 401 (e.g., the key being moved up or down due to actuation of the key). The optical sensor 408 may detect such conditions by detecting any suitable property or characteristic of light, such as light intensity, brightness, angle of incidence, luminous flux, or changes in these (or other) properties.

The key assembly 400 may also include other optical components, such as a light source 410 that is associated with the optical sensor 408. The light source 410 may project light (arrow 412) towards the keycap 401, some of which may pass through the semitransparent mirror layer 402 (and the keycap 401). The optical sensor 408 may detect a reflected portion of the emitted light (arrow 414) to detect or assist in detection of the presence of a finger or movement of a finger or the keycap 401. The light source 410 and the optical sensor 408 may be configured to emit and detect, respectively, nonvisible light, such as infrared light.

The semitransparent mirror layer 402 may prevent the optical sensor 408 and optional light source 410 from being visible to an observer. More particularly, the semitransparent mirror layer 402 may allow the optical sensor 408 to receive light through the keycap 401 (e.g., represented by arrow 414, regardless of its source), but may also reflect external or ambient light, as represented by arrows 416. Accordingly, the key assembly 400 may appear to have a fully mirrored, opaque keycap while also providing enough transparency for the optical sensor 408 to function. The keycap 401 may also have a glyph, incorporated in any suitable manner. For example, the keycap 401 may have a mask layer that defines a mirrored glyph, as described herein. As another example, the keycap 401 may have an ink, dye, or paint applied to the keycap 401 to form the glyph. While the instant application describes sensors and light sources, other optical components may be configured to transmit and/or receive light through semitransparent mirror layers as described herein, including displays, lasers, cameras, optical biometric sensors, optical fingerprint sensors, or the like.

Figure 5A:
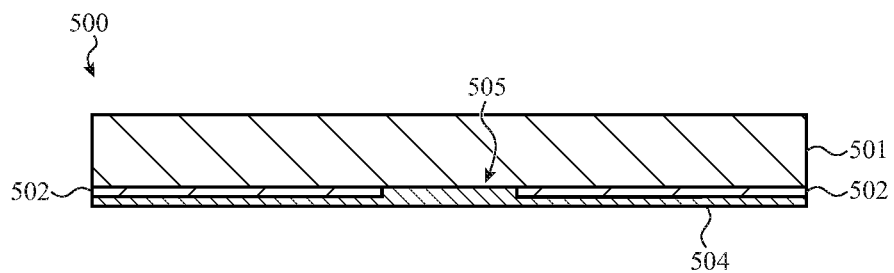
FIGS. 5A-5C depict example keycap configurations having semitransparent mirror layers.
Figure 5B:
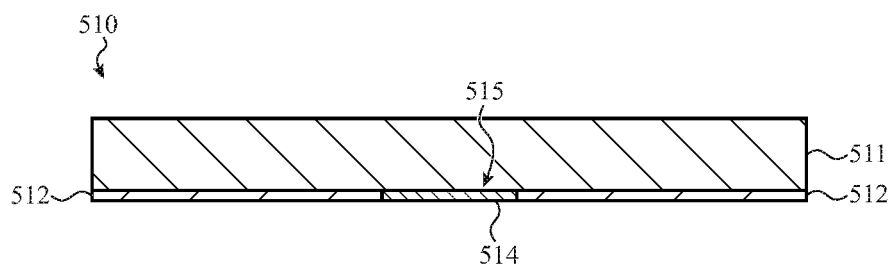
Figure 5C:
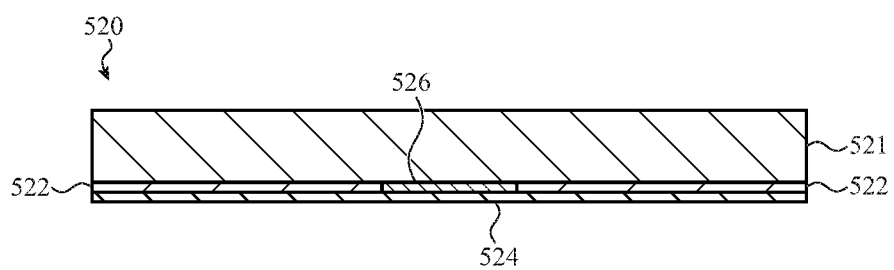

FIGS. 5A-5C show partial cross-sectional views of example keycaps that include semitransparent mirror layers as described herein. FIG. 5A shows a keycap 500 including a body 501, a mask layer 502, and a semitransparent mirror layer 504. The body 501 may be formed from a substantially transparent material, such as glass, sapphire, plastic, ceramic, resin, or the like.

The mask layer 502 defines an opening 505 that defines a glyph (e.g., a character, number, punctuation mark, function indicator, icon, or other symbol). The mask layer 502 may be substantially (e.g., entirely) opaque, thus blocking light from below the keycap 500 from being transmitted through the keycap body 501.

The semitransparent mirror layer 504 is disposed in the opening 505 thus producing a mirrored glyph having a shape that is defined by the shape of the opening 505. The semitransparent mirror layer 504 may be formed of any material that produces a specular reflection (mirror surface) visible on the keycap, but also allows some light to pass through to illuminate the glyph. For example, the semitransparent mirror layer 504 may include a metal layer or coating (e.g., silver, aluminum, gold, copper, or the like) having a thickness in the glyph region (e.g., in the glyph opening 505) of between about 5 microns and about 50 microns. In the glyph opening 505, the semitransparent mirror layer 504 may have a reflectance (from a top or external surface of the keycap) of between about 10% and about 90% reflective, or between about 40% and about 90% reflective, or between about 60% and about 85% reflective, though other values are also contemplated. The semitransparent mirror layer 504 may also or instead be characterized by a transmissivity of between about 10% and about 90%, between about 40% and about 90%, or between about 60% and about 85%, though other values are also contemplated.

As shown in FIG. 5A, the semitransparent mirror layer 504 is positioned in the glyph opening 505, and also extends over the mask layer 502 as well. In other embodiments, the semitransparent mirror layer 504 may not extend over the mask layer 502. For example, FIG. 5B shows an example keycap 510 that includes a body 511 and a mask layer 512 (similar to the body 501 and mask layer 502), as well as a semitransparent mirror layer 514 that is positioned substantially only in the opening 515. This may result in a thinner keycap and may use less material than a semitransparent mirror layer that covers an entire bottom surface of the keycap. The semitransparent mirror layer 514 may have the same or similar composition and properties as the semitransparent mirror layer 504.

In some cases, the semitransparent mirror layer may not extend into the opening, but rather may be below the opening such that it is visible through the opening. For example, FIG. 5C shows an example keycap 520 that includes a body 521 and a mask layer 522 (similar to the body 501 and mask layer 502), as well as a semitransparent mirror layer 524 below the mask layer 522. The keycap 520 also includes a transparent layer 526 in the glyph opening formed by the mask layer 522. The transparent layer 526 may be any suitable material, such as a plastic, epoxy, adhesive, or any other suitable material, and may, together with the mask layer 522, define a substantially planar bottom surface of the keycap on which a substantially flat semitransparent mirror layer 524 of substantially uniform thickness may be deposited or otherwise formed.

Figure 6:
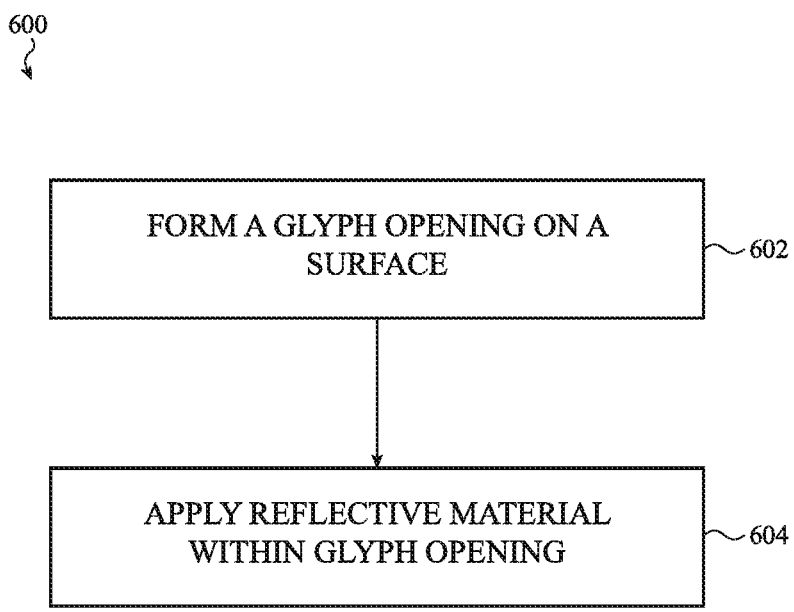
FIG. 6 depicts a process of forming a keycap having a semitransparent mirror layer.

FIG. 6 is a flow chart showing an example method of forming a keycap having a glyph with a semitransparent mirror layer, as described herein. At operation 602, a glyph opening is formed on a surface of a keycap body. In some cases, a substantially opaque layer of ink, paint, dye, or other opaque material may be applied to the surface in a manner that directly forms the glyph opening. For example, the layer may be formed by screen printing, pad printing, inkjet printing, or any other suitable process. In other cases, the substantially opaque layer may be applied to or otherwise formed on the keycap, and then a portion of the layer may be removed (e.g., via laser ablation, mechanical ablation, machining, etc.) to define the glyph opening. Any suitable process for forming an opaque layer that defines a glyph opening may be used.

At operation 604, a reflective material is applied within or below the glyph opening. The reflective material may be any suitable material and may be coated or otherwise applied in any suitable manner. For example, the reflective material may be a metal such as silver, aluminum, beryllium, chromium, copper, gold, molybdenum, nickel, and platinum. The reflective material may be applied using a deposition process such as chemical vapor deposition, physical vapor deposition, laser metal deposition, direct metal deposition, sputtering or any other suitable deposition process. The reflective material may be built up to a thickness between about 5 and about 50 microns.

FIGS. 7A-7E show partial cross-sectional views of a keycap 700 at various stages of a process of forming a semitransparent mirror glyph on the keycap. The process shown in FIGS. 7A-7E may produce a keycap similar to that shown in FIG. 5A.

Figure 7A:
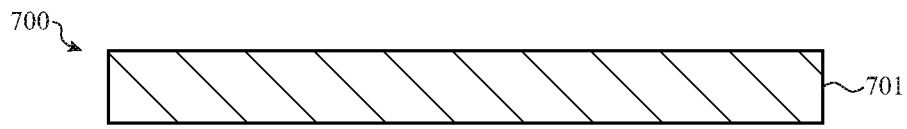
FIGS. 7A-7E depict stages of a process of forming a keycap having a semitransparent mirror layer.
Figure 7B:
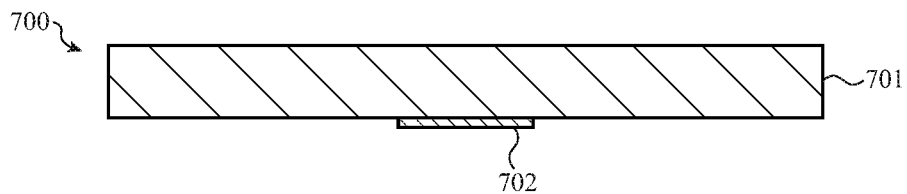

FIG. 7A shows a keycap body 701, which may be a substantially transparent material such as glass, plastic, ceramic, sapphire, or any other suitable material. FIG. 7B shows the keycap body 701 with a glyph mask 702 applied to a bottom surface of the body 701. The glyph mask 702 may have the shape of a glyph to be included on the keycap 700. The glyph mask 702 may be any suitable material (e.g., ink, dye, paint, film, etc.) and may be applied in any suitable way (e.g., screen printing, pad printing, ink jet printing, spraying, etc.). The glyph mask 702 may be used to mask an area that is to become the glyph opening in the keycap.

Figure 7C:
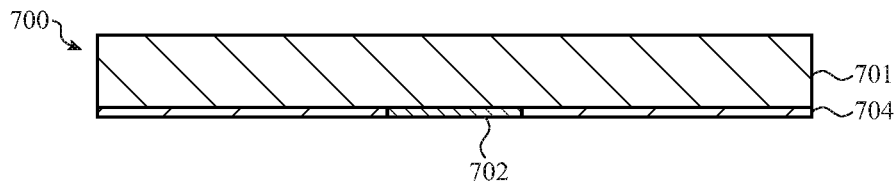
Figure 7D:
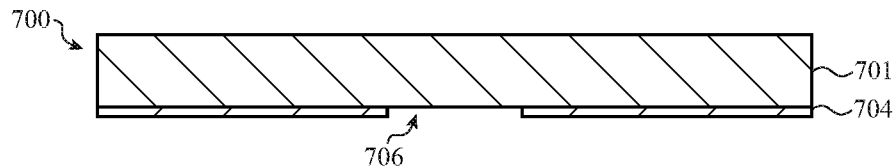

FIG. 7C shows the body 701 after a mask layer 704 has been applied. The mask layer 704 may be a substantially opaque material that is configured to remain on the keycap body 701 to define a cosmetic appearance and provide the border of the glyph opening. FIG. 7D shows the body 701 after removal of the glyph mask 702 to form the glyph opening 706. The glyph mask 702 may be removed in any suitable way, such as via laser etching, physical etching, machining, chemical etching, or any other suitable process, after which a semitransparent mirror layer may be applied.

Figure 7E:
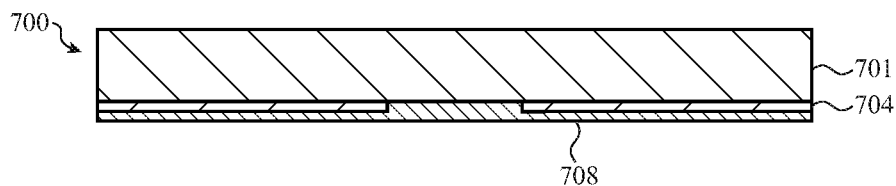

FIG. 7E shows the keycap 700 after a semitransparent mirror layer 708 is applied. The semitransparent mirror layer 708 may be applied in any suitable manner, as described herein (e.g., physical or chemical vapor deposition, sputtering, etc.).

Figure 8A:
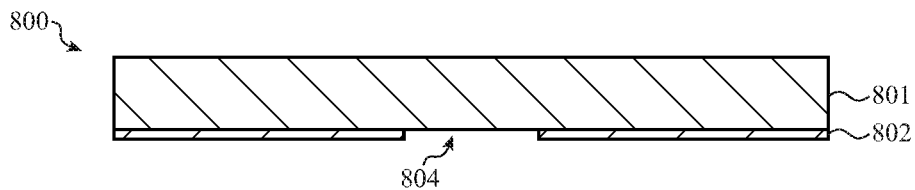
FIGS. 8A-8D depict stages of another process of forming a keycap having a semitransparent mirror layer.

FIGS. 8A-8D show partial cross-sectional views of a keycap 800 at various stages of another process of forming a semitransparent mirror glyph on the keycap. In particular, the process shown in FIGS. 8A-8D may produce a keycap similar to that shown in FIG. 5B. FIG. 8A shows the keycap 800 after a mask layer 802 has been applied to a keycap body 801 and a glyph opening 804 has been formed. This configuration may be achieved as described above with respect to FIGS. 7A-7D.

Figure 8B:
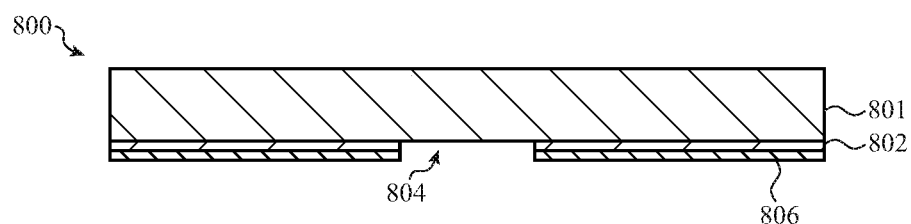

FIG. 8B shows the keycap 800 after an intermediate mask layer 806 (e.g., a paint, film, or the like) has been applied over the mask layer 802. The intermediate mask layer 806 may have an opening that corresponds to the glyph opening 804 to allow a semitransparent mirror material to be deposited in the glyph opening 804 without coating the mask layer 802.

Figure 8C:
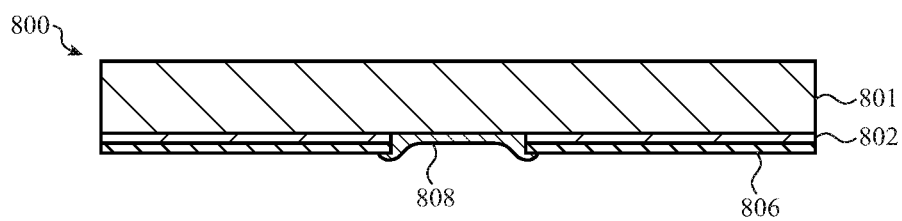

FIG. 8C shows the keycap 800 after a semitransparent mirror layer 808 has been deposited in the glyph opening 804. As shown, some of the material that forms the semitransparent mirror layer may have been deposited onto the intermediate mask layer 806 during application of the semitransparent mirror material.

Figure 8D:
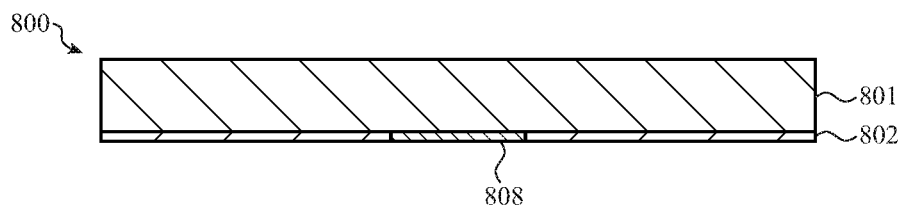

FIG. 8D shows the keycap 800 after the intermediate mask layer 806 has been removed (e.g., by etching, laser, physical removal, peeling, or the like). The process of removing the intermediate mask layer 806 may also remove the excess semitransparent mirror material that was deposited onto the intermediate mask layer 806 during the deposition process. The resulting keycap 800 includes a mask layer 802 on a bottom surface of the keycap 800, with a semitransparent mirror layer 808 in a glyph opening in the mask layer 802. The semitransparent mirror layer 808 does not, however, extend substantially outside of the glyph opening.

While the foregoing embodiments relate generally to glyphs in keycaps for keyboards, semitransparent mirror layers may be used to form glyphs, logos, or other symbols in other components and for other purposes. For example, FIGS. 9A-9C show other example applications for the semitransparent mirror layers described herein.

Figure 9A:
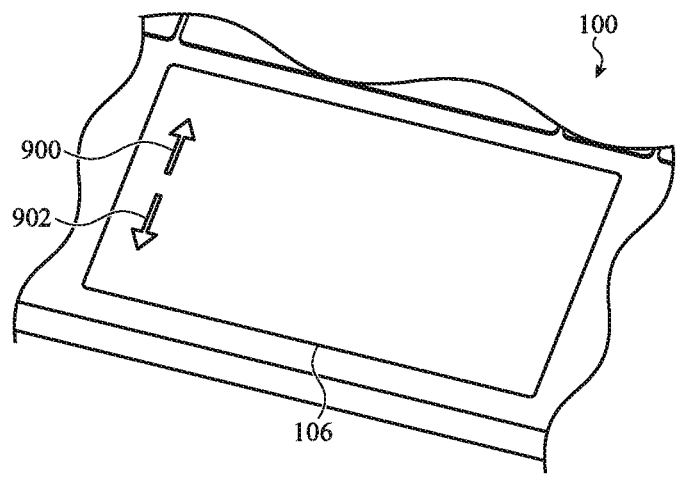
FIGS. 9A-9C depict portions of the electronic device of FIG. 1 having symbols formed with semitransparent mirror layers.

FIG. 9A shows a portion of the electronic device 100 of FIG. 1 including the trackpad 106. The trackpad 106 may be formed from or include a transparent member, such as a glass, plastic, sapphire, etc., defining the input surface. The transparent member may include an opaque mask layer that defines openings in the shape of symbols 900 and 902, and one or more semitransparent mirror layers may be applied to the cover to produce symbols with a mirror-like surface under ambient light conditions, and an illuminated appearance under backlit conditions. The symbols 900, 902 may indicate a function of the trackpad 106. For example, the up and down arrows 900, 902 may indicate that sliding a finger over that portion of the trackpad 106 will scroll or move an interface element being displayed on the device 100.

Figure 9B:
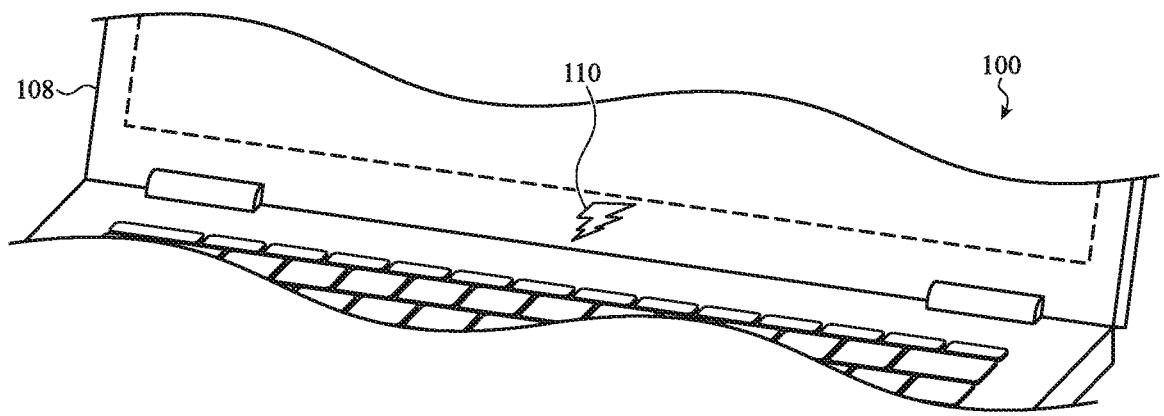
Figure 9C:
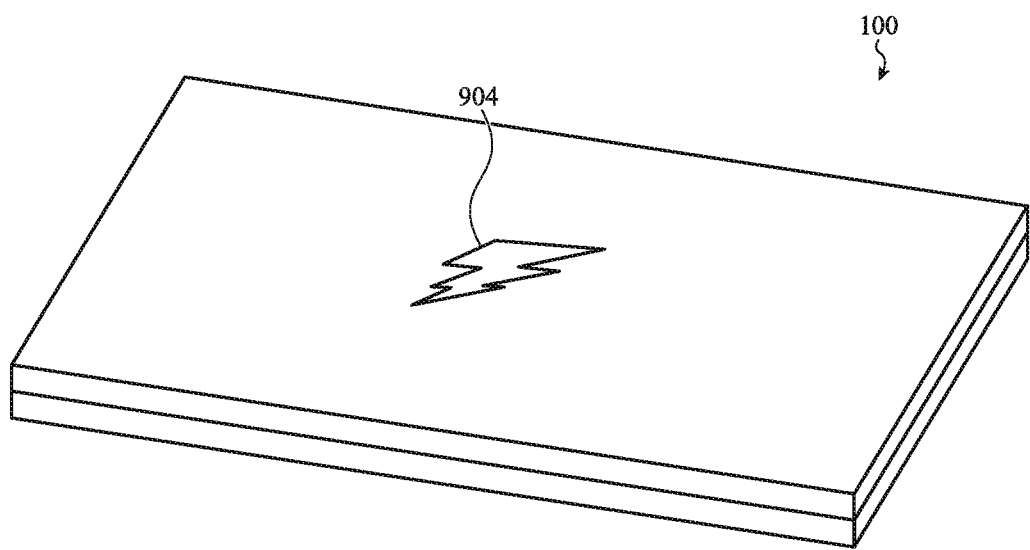

FIG. 9B shows a portion of the device 100 that includes the logo 110 described above with respect to FIG. 1. The logo 110, which may be any shape, text, symbol, or the like, may be constructed similarly to the other glyphs and symbols described herein. For example, the cover 108 may be or may include a transparent material with an opaque masking layer. The opaque masking layer may be formed on an interior surface of the cover 108, and may define an opening corresponding to the logo 110. A semitransparent mirror layer may be overlaid behind the masking layer and in or over the opening to produce the mirror-like appearance described herein. A light source may be positioned behind the logo 110 to illuminate the logo 110.

FIG. 9C shows another portion of the device 100 that includes a logo 904. In this case, the logo may be on an outer portion of the display portion 103. The logo 904 may include a transparent member with a semitransparent mirror layer applied thereto. The transparent member may be inlaid into an opening in the display portion 103. In such cases, the logo 904 may exclude a mask layer, such that an entire surface of the logo 904 (or visible portion of the surface) may appear to have a reflective mirror coating. The logo 904 may be associated with a light source. For example, the logo 904 may have a dedicated light source for illuminating the logo 904. As another example, the logo 904 may receive light from a light source that produces light for a display of the electronic device 100. In such cases, the logo 904 may be illuminated (e.g., backlit) whenever the display is active, and may appear as an opaque mirror whenever the display is inactive.

Figure 10A:
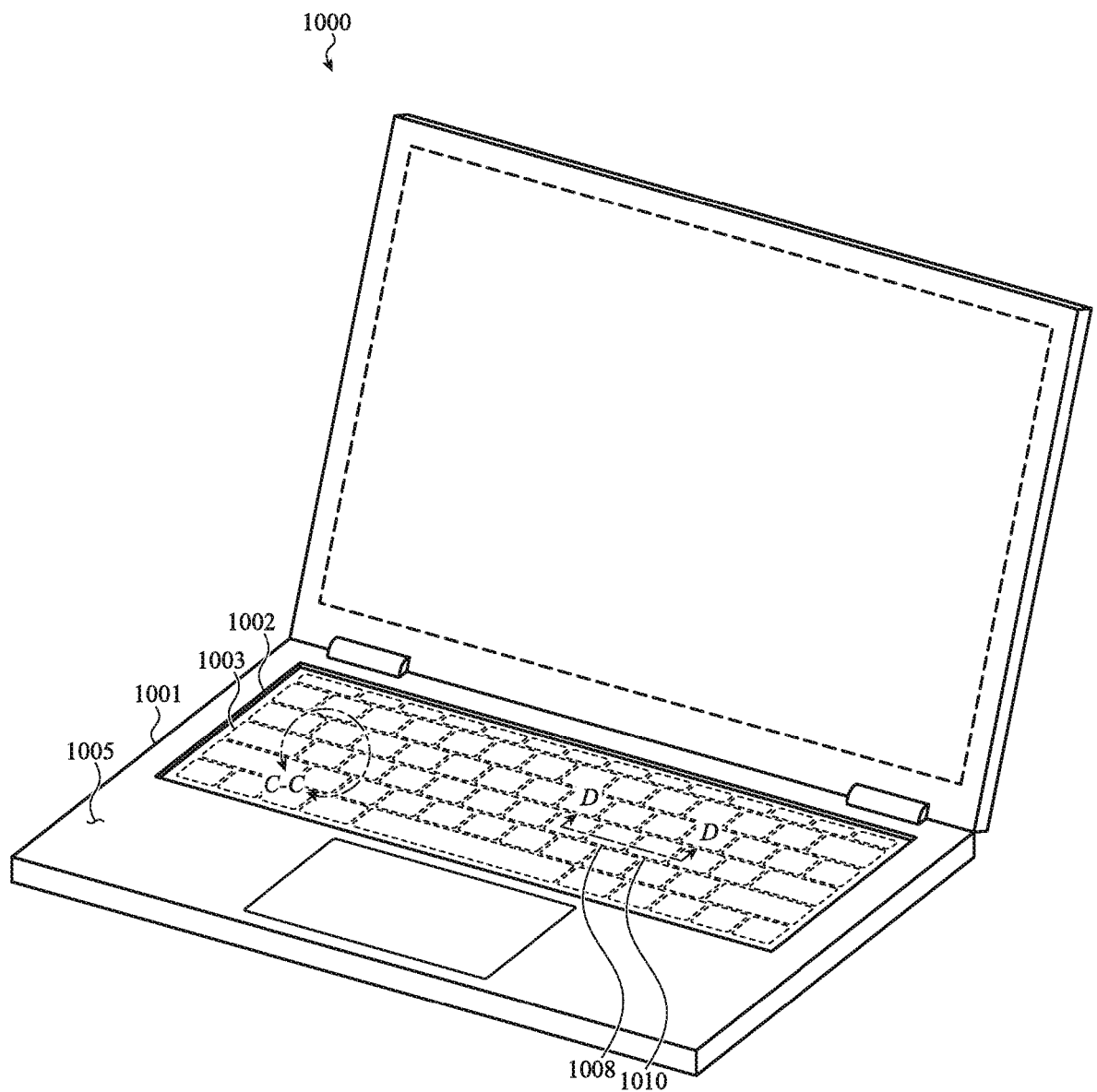
FIG. 10A depicts another example electronic device.
Figure 10B:
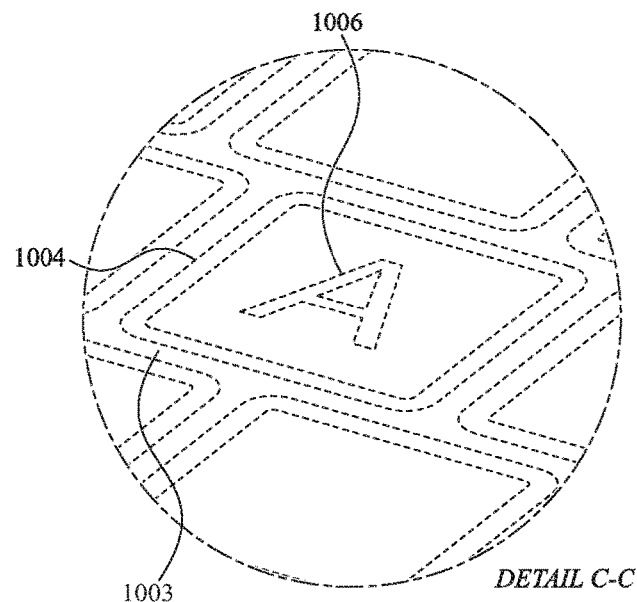
FIG. 10B depicts a detail view of a portion of a keyboard of the electronic device of FIG. 10A.
Figure 10C:
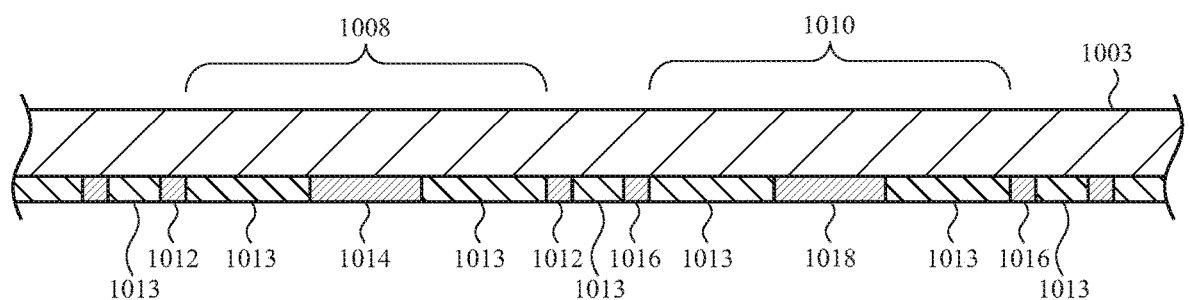
FIG. 10C depicts a partial cross-sectional view of the electronic device of FIG. 10A.

Semitransparent mirror layers may also be used to define other visible aspects of electronic devices. For example, FIGS. 10A-10C depict an example electronic device 1000 that includes semitransparent mirror layers to visually define the borders and glyphs of individual keys of a smooth keyboard surface. The electronic device 1000 may be a laptop computer, and may share the same or similar features and components as the electronic device 100 described above.

FIG. 10A shows an electronic device 1000 having a substrate 1003 on which a keyboard 1002 (e.g., a plurality of individual key regions) is defined by semitransparent mirror layers on the input substrate 1003. For example, the substrate 1003 may be a transparent substrate, such as plastic, ceramic, glass, or the like, on which mask layers and semitransparent mirror layers are applied to define the borders and glyphs of the key regions. Similar to the description of the glyphs and other symbols described above, the borders and glyphs of the key regions may appear as opaque, mirrored regions under ambient light conditions, and may appear illuminated when backlit.

FIG. 10B is a detail view of area C-C in FIG. 10A, showing details of an individual key region of the keyboard 1002. The key region is defined by a border 1004, and includes a glyph 1006. The substrate 1003 may be substantially smooth (e.g., a featureless, planar sheet), and the border 1004 and glyph 1006 may be formed on a bottom surface of the substrate 1003, similar to the keycaps and logos described above. Accordingly, the top of the substrate 1003 that will be touched by a user during typing may lack coatings, paints, or other materials, thus providing a smooth input surface. Moreover, because the materials that define the glyphs and borders of the key regions may be formed on the bottom of the substrate 1003, the durability of the keyboard 1002 may be increased as the materials will not be subject to wear and abrasion and other damage from typing inputs (or other use or misuse).

FIG. 10C is a partial cross-sectional view of a portion of the electronic device 1000, viewed along line D-D in FIG. 10A. In particular, FIG. 10C shows the substrate 1003 and the layers that define the borders and glyphs of key regions 1008 and 1010 of the keyboard 1002. For example, a substantially opaque mask layer 1013 may be positioned on a bottom surface of the substrate 1003. The mask layer 1013 may be similar to the mask layers described above (e.g., the mask layer 302, FIGS. 3A-3B), and may be formed using any of the materials and techniques described above. The mask layer 1013 may define openings that correspond to the borders and glyphs of the key regions 1008, 1010, and semitransparent mirror layers may be positioned in the openings.

For example, a semitransparent mirror layer 1012 may define the border of the key region 1008, and semitransparent mirror layer 1014 may define a glyph of the key region 1008. Similarly, a semitransparent mirror layer 1016 may define the border of the key region 1010, and semitransparent mirror layer 1018 may define a glyph of the key region 1010. The electronic device 1000 may also include a light source below the substrate 1003. Accordingly, when the light source is active, light may be transmitted through the semitransparent mirror layers 1012, 1014, 1016, and 1018 (as well as other semitransparent mirror layers defining other key regions and glyphs) to illuminate the borders and glyphs of all or a subset of the key regions of the keyboard 1002. And, as described above, because the semitransparent mirror layers are opaque under some lighting conditions (e.g., ambient), each key border and glyph may also be visible and may present an opaque mirrored appearance when the backlight is not active.

As shown, the semitransparent mirror layers in FIG. 10C are separate layers that are localized to particular openings in the mask layer 1013, similar to the configuration shown and described with respect to FIG. 5B. In other examples, multiple glyphs and borders may be produced by a continuous, shared semitransparent mirror layer, similar to the configuration shown and described with respect to FIG. 5A. In such cases, the semitransparent mirror layer may substantially cover portions of the mask layer 1013 between various glyph and border openings.

Also, FIG. 10A shows the substrate 1003 as a separate component than another portion of the base portion of the device 1000. For example, the substrate 1003 may be bordered by a frame 1005 or other structural component that defines a large portion of the top surface of the base portion of the device 1000. The frame 1005 may partially overlap a top of the substrate 1003 in order to prevent ingress of material into the device 1000. In other cases, however, the entire top surface of the base portion 1001 is a single, continuous sheet of material, such as glass, plastic, sapphire, ceramic, or the like. In such cases, semitransparent mirror layers may be used to define other input regions or visual indicia on the continuous sheet, such as the border regions of a trackpad region (e.g., the trackpad region 106, FIG. 1), logos, symbols, input regions or other affordances (e.g., virtual keys), or the like.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. For example, while the methods or processes disclosed herein have been described and shown with reference to particular operations performed in a particular order, these operations may be combined, subdivided, or re-ordered to form equivalent methods or processes without departing from the teachings of the present disclosure. Moreover, structures, features, components, materials, steps, processes, or the like, that are described herein with respect to one embodiment may be omitted from that embodiment or incorporated into other embodiments.

What is claimed is:

1. An electronic device comprising:
   an enclosure;
   a substrate within the enclosure;
   a keycap support mechanism;
   a keycap supported by the keycap support mechanism and movable relative to the substrate, the keycap comprising:
      a body having a top surface and a bottom surface;
      a mask layer applied to the bottom surface and defining a glyph opening, the mask layer being configured to non-specularly reflect light passing from the top surface of the body to a top surface of the mask layer; and
      a semitransparent mirror layer applied to the bottom surface having a first portion positioned within the glyph opening and contacting the bottom surface of the body, and having a second portion positioned below the mask layer; and
   a light source configured to direct light through the semitransparent mirror layer;
   wherein the semitransparent mirror layer is configured to specularly reflect light passing from the top surface of the body to the glyph opening to produce an appearance of a mirror at the bottom surface of the body of the keycap; and
   wherein the semitransparent mirror layer comprises a side portion positioned on a side surface of the body and above the second portion.

2. The electronic device of claim 1, wherein:
   the enclosure is a base portion of a laptop computer;
   the keycap is positioned within the base portion; and
   the semitransparent mirror layer is a metal coating configured to:
      in a first lighting condition, reflect external light incident on the semitransparent mirror layer; and
      in a second lighting condition, transmit light from the light source through the semitransparent mirror layer.

3. The electronic device of claim 1, wherein the light source is a light emitting diode positioned below the keycap.

4. The electronic device of claim 1, wherein the first portion of the semitransparent mirror layer fills an entire thickness of the mask layer.

5. The electronic device of claim 1, wherein the semitransparent mirror layer is a metal coating.

6. The electronic device of claim 5, wherein the metal coating comprises aluminum.

7. The electronic device of claim 1, wherein the body is glass.

8. An actuation member for a key assembly, comprising:
   a transparent body having a bottom surface and a side surface;
   an opaque mask layer contacting the bottom surface and defining a glyph opening; and
   a semitransparent mirror layer having a bottom portion and a side portion, the bottom portion contacting the bottom surface of the transparent body and aligned with the glyph opening of the opaque mask layer, the semitransparent mirror layer being configured to produce a visible glyph when the actuation member is illuminated either from below the actuation member or from above the actuation member, the side portion being positioned on the side surface of the transparent body and above the bottom portion.

9. The actuation member of claim 8, wherein at least a portion of the semitransparent mirror layer is within the glyph opening.

10. The actuation member of claim 9, wherein another portion of the semitransparent mirror layer is below the opaque mask layer.

11. The actuation member of claim 8, wherein the semitransparent mirror layer is between about 60% and about 85% reflective.

12. The actuation member of claim 8, wherein the semitransparent mirror layer has a thickness between about 5 microns and about 50 microns.

13. The actuation member of claim 8, wherein the transparent body is formed from glass.

14. The actuation member of claim 8, wherein the transparent body comprises:
   a top surface defining an input surface of the actuation member;
   the bottom surface opposite the top surface; and
   the side surface extends between the top surface and the bottom surface.

15. A laptop computer comprising:
   a display portion;
   a display positioned within the display portion;
   a base portion pivotally coupled to the display portion;
   a keyboard at least partially surrounded by the base portion and comprising a key; and
   an optical sensor below the key;
   wherein the key comprises:
      a keycap;
      an opaque mask layer on a bottom surface of the keycap and defining an opening; and
      a semitransparent mirror layer having a first portion on the bottom surface of the keycap and at least partially within the opening of the opaque mask layer, the semitransparent mirror layer having a second portion covering a side surface of the keycap and configured to reflect light into the keycap over the first portion; and
   wherein the optical sensor is configured to receive light through the semitransparent mirror layer and the keycap.

16. The laptop computer of claim 15, further comprising a light source below the keycap and configured to transmit light through the semitransparent mirror layer.

17. The laptop computer of claim 16, wherein the light received by the optical sensor through the semitransparent mirror layer is the light, from the light source, reflected by an object above the keycap.

18. The laptop computer of claim 15, wherein the optical sensor is configured to detect an optical condition indicative of a presence of an object above the keycap.

19. The laptop computer of claim 15, wherein the optical sensor is configured to detect an optical condition indicative of motion of the keycap.

* * * * *